United States Patent [19]
Nilsson

[11] Patent Number: 6,149,125
[45] Date of Patent: Nov. 21, 2000

[54] POSITIVELY CONTROLLED BALL VALVE

[75] Inventor: Lennart Nilsson, Östersund, Sweden

[73] Assignee: Lenko L. Nilsson, Ostersund, Sweden

[21] Appl. No.: 09/254,479

[22] PCT Filed: Jun. 11, 1997

[86] PCT No.: PCT/SE97/01023

§ 371 Date: Mar. 8, 1999

§ 102(e) Date: Mar. 8, 1999

[87] PCT Pub. No.: WO98/10207

PCT Pub. Date: Mar. 12, 1998

[30] Foreign Application Priority Data

Sep. 9, 1996 [SE] Sweden .................................. 9603267

[51] Int. Cl.[7] .......................... F16K 31/163; F16K 15/18
[52] U.S. Cl. ............................. 251/82; 251/63.4; 137/522
[58] Field of Search .............................. 251/63.4, 77, 82; 137/522, 523, 589, 596.2

[56] References Cited

U.S. PATENT DOCUMENTS

| 1,992,490 | 2/1935 | Lewis ...................................... 251/82 X |
| 4,070,239 | 1/1978 | Bevilacqua .............................. 251/82 X |
| 4,273,310 | 6/1981 | Krueger ................................. 251/63.4 X |
| 4,452,177 | 6/1984 | Plett ....................................... 119/14.32 |
| 4,457,340 | 7/1984 | Krueger ................................. 251/63.4 X |
| 4,662,392 | 5/1987 | Vadasz ................................. 137/533.11 |
| 4,667,696 | 5/1987 | Van Rensburg ..................... 137/533.15 |
| 4,838,306 | 6/1989 | Horn et al. .............................. 137/522 |
| 5,037,062 | 8/1991 | Neuhaus ................................. 251/82 X |
| 5,306,122 | 4/1994 | Gebauer .............................. 137/522 X |

FOREIGN PATENT DOCUMENTS

| 0 101 589 | 2/1984 | European Pat. Off. . |
| 0 164 189 | 12/1985 | European Pat. Off. . |
| 2 190 173 | 11/1987 | United Kingdom . |

Primary Examiner—Kevin Shaver
Assistant Examiner—Eric Keasel
Attorney, Agent, or Firm—Larson & Taylor PLC

[57] ABSTRACT

A positively controlled ball valve for flowing fluids, in particular water, for instance for use in snow making machines. The valve includes a valve housing (1) having a flow passageway (3) for the water (7), a valve seat (9) arranged in the flow passageway (3), and a valve ball (10) which is movable towards and from the valve seat (9). A force actuation device (4) having a piston rod (20) positively acts on the valve ball (10), which is movable in a race (11) in the valve housing (1). The race extends from the valve seat (9) obliquely outwards-rearwards, upstream of the flow of water (7). The force actuation device (4) is formed with a piston rod (20) arranged for being able to force the valve ball (10) in the direction away from the valve seat (4) and into the race (11) for the ball. The piston rod (20) is arranged to act on the valve ball (10), in the first stage of the opening of the valve, so that the ball at least partly rolls out of the valve seat (9). The valve seat (9) is formed with a valve sealing (14) of an elastomeric material having a metal ring (16) engaging the inner surface and the rear end of the valve sealing (14).

11 Claims, 2 Drawing Sheets

POSITIVELY CONTROLLED BALL VALVE

The present invention relates to a ball valve which can be positively controlled by manual operation like using electric, pneumatic or hydraulic means. In tests performed so far the valve has mainly been controlled by hydraulic means. A ball valve controlled for instance by hydraulic means has been developed to provide a solution of the problem of creating a valve which has small dimensions and which is useful for controlling fluids, in particular liquids under high pressures.

More specifically the invention has been developed as a solution of providing a valve suited for use in snow making machines, in which relatively large amounts of water under high pressure, as high as up to 40 bar, pass through the valve, and in which it must be possible to open and close the valve in a calm and stable course, and in which the valve must be capable of standing the high pressures and large amounts of passing water which appear in for instance snow making machines.

It is obvious that the valve according to the invention may be used for gases as well as for liquids, even if it will in the following be described mainly as a valve for liquids, in particular for water.

BACKGROUND OF THE INVENTION

Many various types of valves useful for the said purpose are known in the art, for instance disk valves, cone valves, and rotatable ball valves having a flow passageway in the valve ball. All such valves are disadvantageous for use in valves subjected to high liquid pressures. The pressure from the liquid may make it difficult to open the valve, since the opening must be made by a movement the direction of which is opposed to the liquid pressure; it may be difficult to close the valve in a calm course, since the liquid, depending on the pressure thereof against the valve disk or valve cone, tends to provided a quick and violent closing movement; in many cases the liquid pressure against the valve cone or against the rotatable valve ball may create a high friction which must overcome; in some cases the high liquid pressure may tend to provide an unintentional partly opening of the valve; the quick movement of liquid under high pressure also may provide cavitation damages both on the valve cone and on the valve seat. Further, many known valves are so bulky that they are not suited for use in snow making machines.

BRIEF SUMMARY OF THE INVENTION

According to the invention the above mentioned problems are solved by means of a ball valve, in which the valve element is formed as a smooth ball which is displaceable actuated by a hydraulic press piston, and in which the opening of the valve is made in that said hydraulic press piston forces the valve ball sideways out of a valve seat by a force having a first force component which is directed oppositely to the flow direction of the water through the valve and a second force component which is directed perpendicularly to the said flow direction, and in which the closing of the valve is accomplished by the liquid pressure against the valve ball, whereby the hydraulic piston is preferably used for braking the closing movement of the ball.

In order to guarantee a good operation and to allow an automatic closing of the valve when a hydraulic actuation piston is retracted the race in which the valve ball is displaceable is inclined at least slightly rearwards, meaning upstream against the flow of water as seen from the valve seat, whereby the opening of valve is consequently accomplished both by a force component which is directed perpendicularly to the flow direction and by a force component which is parallel to and opposed to said flow direction. By this design the valve can be opened calmly and safely using a relatively little force, and the valve can be closed the same calmly and safely.

In a specially preferred embodiment the hydraulic valve actuation piston is mounted and arranged in such position in relation to the valve ball that said piston, when starting the force actuation of the valve ball in the opening direction, engages the valve ball along a line of force which is located upstream of the centre of the ball as seen in the flow direction, whereby the ball is opened by being at least partly rolled out of the valve seat. During the last phase of the opening movement the hydraulic piston actuates the valve ball in a direction close to the centre of the ball.

For providing a good sealing against the valve ball the valve seat is formed with a sealing ring of an elastomeric material, which ring is seated in a groove of the valve seat. A specific problem in valves of the said type is that the sealing ring, depending on the high liquid speed and the high liquid pressure may be torn or pressed out of its mounting groove and can thereby be blown away from the valve seat. For solving said problem the valve seat is formed with a support ring of metal, preferably of stainless steel, which engages the downstream end and the inner surface of the elastomeric ring thereby keeping same in place and preventing a tearing of said elastomeric ring out of the valve seat.

BRIEF DESCRIPTION OF THE DRAWINGS

Further characteristics and advantages of the invention will be evident from the following detailed description of an embodiment of the invention, in which description reference is made to the accompanying drawings. In the drawings

DETAILED DESCRIPTION OF THE INVENTION

Figure 1:
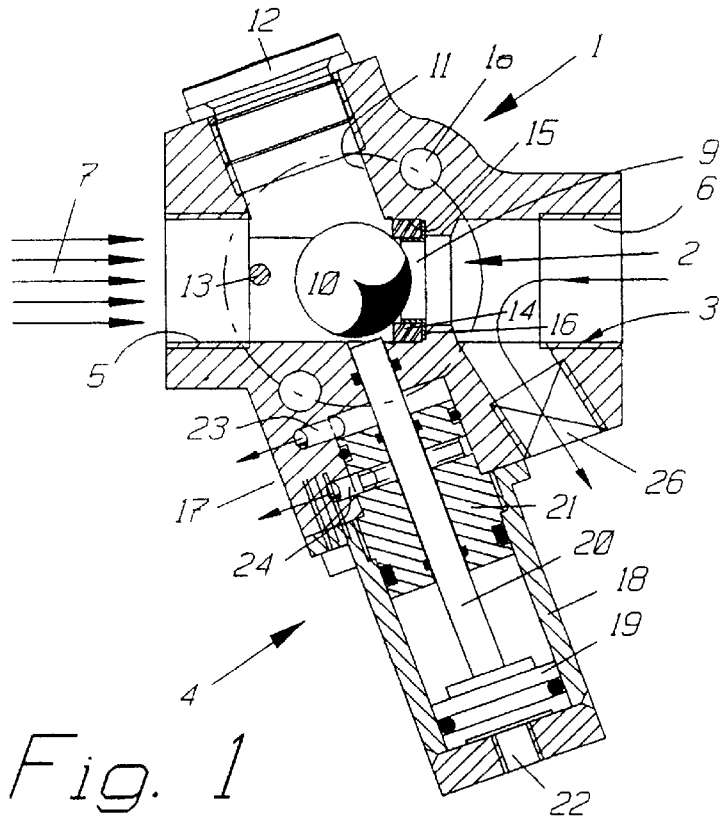
FIG. 1 shows an axial section through a hydraulically controlled valve according to the invention in its closed condition.
Figure 2:
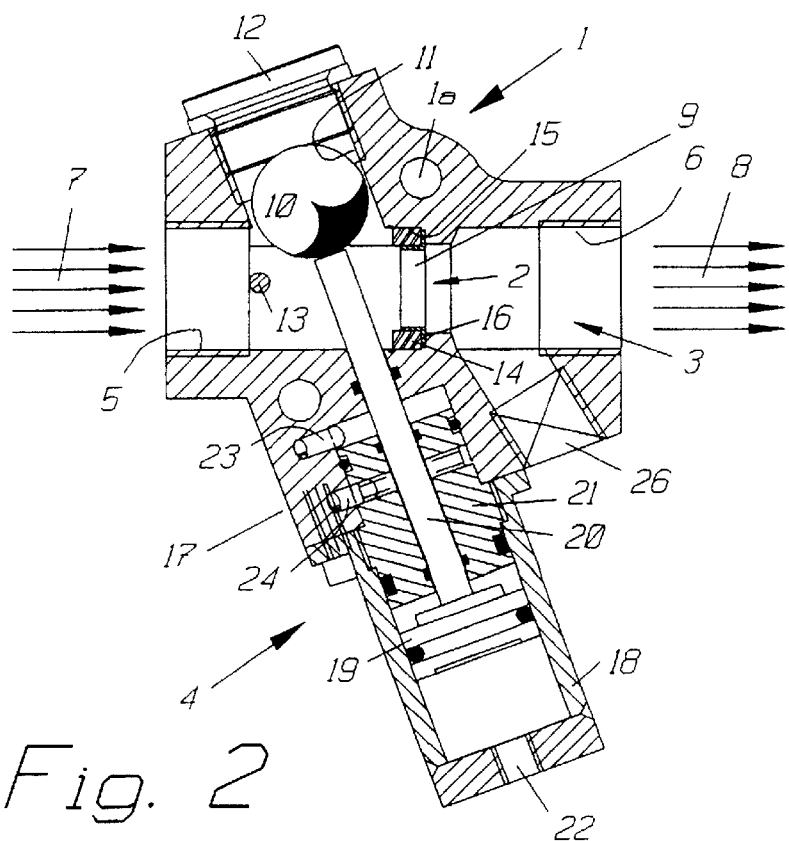
FIG. 2 shows, in the same way as in FIG. 1, the valve in its fully opened condition.

The valve shown in the drawings generally comprises a valve housing 1 having a valve means 2 which is arranged in a flow passageway 3, and a hydraulic means 4 for opening of the valve and for braked closing of the valve.

The valve housing 1 is formed with a flow passageway 3 extending straight through the valve from an inlet 5, past the valve means 2 and to an outlet 6. Adjacent the inlet 5 there is a connection means 7 for liquid under high pressure, and the outlet is connected to a liquid consumption place 8, which, in case said consumption place 8 is a snow making machine, can be a ring of spray nozzles for providing artificial snow. The valve housing is formed with a valve seat 9 provided in the flow passageway 3 and against which valve seat a ball formed valve closing element 10 is adapted to provide a seal. In the valve housing there is a race 11 in which the valve ball 10 can be displaced when the valve is being opened in that the valve ball 10 is forced out of the valve seat 9 which is done by means of the hydraulic control means 4. For manufacturing reasons the race 11 is open at the top of the valve housing, and said opening at the valve housing top is sealed by a screw cap 12. According to the invention the race 11 for the ball 10 is arranged at an angle v upstream against the flow of liquid of 10–30°, preferably at an angle of 15–25°. The purpose thereof is that valve ball should be self-closing in that said ball is actuated in closing direction by the flow of liquid exerting a first force component directed radially inwards to the centre of the passageway 3 and by a second force component directed towards the valve seat parallelly to the flow direction. The valve ball race 11 has such length that the valve ball 10, in its fully opened condition, exposes substantially the entire flow passageway 3. For preventing the valve ball 10 from rolling out of the race 11 (towards the inlet 5) there is a lock pin 13 in the flow passageway 3 adjacent the inlet 5.

As usual the valve housing 1 is formed with connection means, for instance connection bores 1a, making it possible to mount the valve in a suitable place.

Figure 3:
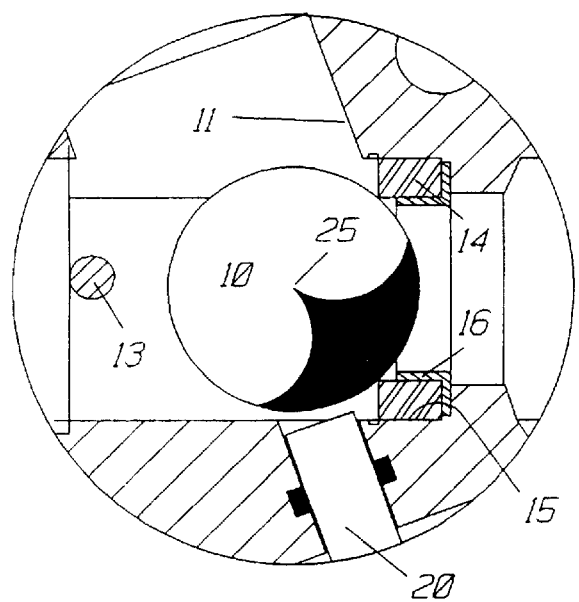
FIG. 3 is an enlarged view of the part of FIG. 1 which is encircled by a phantom line.
Figure 4:
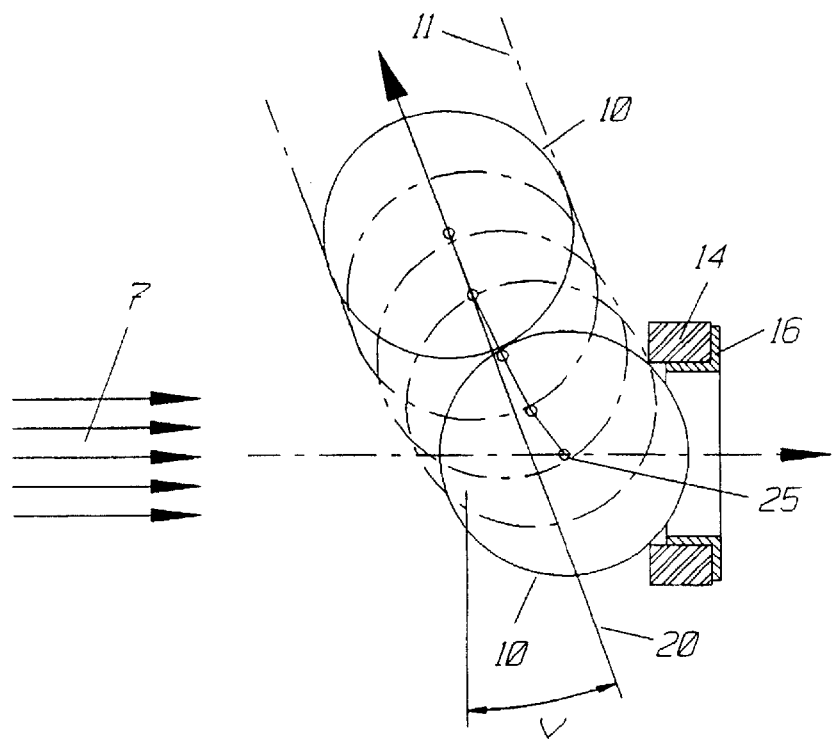
FIG. 4 diagrammatically, and in five stages shows the movement of the valve ball and the actuation movement of the hydraulic piston during the opening movement.

As best shown in FIGS. 3 and 4 the valve seat 9 is formed with a sealing ring 14, preferably of an elastomeric material, which is mounted in a groove 15 of the valve housing 1. For eliminating the risque that the sealing ring 14 is forced out of the groove 15 by the flow 7 of liquid passing with high speed and high pressure, often up to a pressure of 10 bar, the sealing ring 14 is formed with a support ring 16 of metal, like of stainless steel, which has an angular cross section shape, and which engages the downstream end and the inner surface of the elastomeric ring 14. The support ring 16 is, with the radially outwards directed angle portion engaging the valve housing groove 10, and is formed with a slightly less axial length than that of the sealing ring 14, so that valve ball 15 engages only the elastomeric ring, namely the inner rear edge thereof.

The hydraulic control means 4 are mounted in a recess 17 of the valve housing 1 arranged substantially on line with the race 11 for the valve ball 10. The control means comprises a cylinder 18 in which a piston 19 with a piston rod 20 is movable. The cylinder 18 is screw connected to the valve housing 1 by means of diagrammatically indicated screws. For centering and stabilising the piston rod 20 the cylinder comprises a piston rod guide 21 at the cylinder end adjacent the flow passageway. At the bottom of the cylinder 18 there is a connection 22 for introducing a hydraulic fluid under pressure in the cylinder. The piston rod is, by means of O-rings, sealed both against the guide 21 and against the valve housing adjacent the flow passageway 3. For draining of water which may eventually enter towards the piston from the flow passageway 3 there is a drain passageway having an outlet 23 above the upper end of the piston rod guide 21, and for draining of oil which may be pressed up into the guide 21 there is a corresponding oil drain passageway having an outlet 24.

As shown in the drawings, and as best evident from the diagrammatical illustration in FIG. 4 the piston rod 20 is mounted in such relationship to the ball 10 that said piston rod 20, when the ball is in its closed position, engages the ball over a line of action upstream of the centre point of the ball. This is preferred in that the valve ball 10, when forced out of the valve seat 9 by the piston rod 20, will thereby at least partly roll against the upper edge of the elastomeric ring 14. Such operation prevents friction and wear both of the ball 10 and of the elastomeric ring 14. It is shown in FIG. 4 that the ball 10 is successively displaced with the centre thereof closer and closer to the action line of the piston rod 20 following the displacement upwards of the ball in the race 11, and that the final forcing upwards of the ball is made with the piston rod 20 acting directly against the centre 25 of the ball 10. The opening operation is thereby accomplished safely using a relatively little force. When the valve is to be closed the water pressure forces the ball 10 downwards and in a downstream movement in the flow passageway 3. Thereby the valve acts in a self-closing way. For avoiding a too quick and violent closing of the valve the pressure of the hydraulic oil in the cylinder 18 can be reduced successively, so that the closing of the valve follows softly and in a controlled movement.

By setting the hydraulic control means 4 so that the piston rod 20 blocks the valve ball 10 in various "opened" positions in the flow passageway 3 it is very well possible, in any specific position, to control the flow of liquid through the passageway 3, whereby the flow of liquid can be controlled from very little flow to maximum flow.

In order to prevent flow medium, in particular water, from remaining in conduits etc. at the outlet side of the valve the valve housing is, adjacent the valve seat, formed with a drain valve 26 which is opened as soon as the valve has been closed, so that remaining water is drained.

What is claimed is:

1. A positively controlled ball valve for fluids, comprising:
    a valve housing having a flow passageway for a flow of a fluid,
    a valve seat provided in said flow passageway,
    a valve ball which is movable towards and from said valve seat,
    a race in the valve housing in which the valve ball is movable, which race extends from the valve seat obliquely rearwards, upstream of the flow of the fluid, and
    a force actuation means for positively acting on said valve ball, the force actuation means including a piston rod arranged to force the valve ball in the direction away from the valve seat and into the race for the ball.

2. A ball valve as claimed in claim 1, wherein the race for the valve ball in the valve housing extends at an angle upstream of the flow of the fluid of 10–30°.

3. A ball valve as claimed in claim 2, wherein the angle of the race for the valve ball in the valve housing is 15–25°.

4. A ball valve as claimed in claim 1, wherein the piston rod of the force actuation means is arranged to operate in the same direction as an axial direction of the race for the valve ball in the valve housing.

5. A ball valve as claimed in claim 1, wherein the valve ball is freely movable between the valve seat and an end of the race for the valve ball, and wherein the race has a length such that the valve ball, when moved to a fully opened position, exposes substantially the entire flow passageway.

6. A ball valve as claimed in claim 1,
    wherein the force actuation means is a hydraulic cylinder having a piston attached to the piston rod,
    wherein the piston rod directly engages the valve ball, and
    wherein the piston rod, in a retracted position thereof, allows a complete closing of the flow passageway and, in a fully expanded position thereof, provides a substantially full exposing of the flow passageway.

7. A ball valve as claimed in claim 6,
    wherein the hydraulic cylinder encloses a piston rod guide,
    further including a drain passageway in the valve housing for leaking-in fluid located between the piston rod guide and the flow passageway of the valve housing, and further including a further drain passageway in the valve housing for leaking-in hydraulic oil located in the piston rod guide.

8. A ball valve as claimed in claim 1, wherein the piston rod is arranged and placed in relation to the valve ball so that said piston rod, in a closed position of the ball, engages the ball along an imaginary line passing slightly rearwards of a center, of the ball, whereby said ball, from a closed position thereof, can be brought to roll out of the valve seat.

9. A ball valve as claimed in claim 8, wherein the valve seat and the race for the valve ball are formed so that an action line of the piston rod towards the ball, after the ball has been forced out of the valve seat, successively approaches the center of the ball.

10. A ball valve as claimed in claim 1, wherein the valve seat comprises a valve sealing ring of elastomeric material and an angular support ring of metal engaging an inner surface and a downstream end of the valve sealing ring, and wherein the valve sealing ring with the support ring is mounted in a groove of the flow passageway.

11. A ball valve as claimed in claim 1, wherein the valve housing, at a downstream side of the valve seat, includes a drain valve for draining remaining fluid from the downstream side when the valve is closed.

* * * * *